(12) United States Patent
Park

(10) Patent No.: US 10,081,909 B2
(45) Date of Patent: Sep. 25, 2018

(54) THERMOPLASTIC POLYURETHANE COMPOUND COMPOSITION FOR COATED YARN AND METHOD FOR MANUFACTURING COATED YARN USING THE THERMOPLASTIC POLYURETHANE COMPOUND

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 98 days.

(21) Appl. No.: 15/227,132

(22) Filed: Aug. 3, 2016

(65) Prior Publication Data

US 2016/0340828 A1 Nov. 24, 2016

Related U.S. Application Data

(60) Division of application No. 14/314,400, filed on Jun. 25, 2014, now Pat. No. 9,856,599, which is a
(Continued)

(30) Foreign Application Priority Data

Dec. 30, 2011 (KR) .................. 10-2011-0146923
Oct. 16, 2012 (KR) .................. 10-2012-0114735

(51) Int. Cl.
| | |
|---|---|
| *D06M 15/564* | (2006.01) |
| *C09D 175/04* | (2006.01) |
| *C08L 75/04* | (2006.01) |
| *C09D 175/06* | (2006.01) |
| *C09D 175/08* | (2006.01) |
| *D06M 101/32* | (2006.01) |

(Continued)

(52) U.S. Cl.
CPC .......... *D06M 15/564* (2013.01); *C08L 75/04* (2013.01); *C09D 175/04* (2013.01); *C09D 175/06* (2013.01); *C09D 175/08* (2013.01); *D06M 2101/32* (2013.01); *D06M 2101/34* (2013.01); *D06M 2101/38* (2013.01)

(58) Field of Classification Search
CPC .................................................. C09D 175/04
See application file for complete search history.

(56) References Cited

FOREIGN PATENT DOCUMENTS

| KR | 100444297 B1 * | 8/2004 |
|---|---|---|
| KR | 100875709 B1 * | 12/2008 |

OTHER PUBLICATIONS

English Machine Translation KR100875709 B1Obtained Sep. 13, 2016 at:https://worldwide.espacenet.com/publicationDetails/biblio?DB=EPODOC&II=0&ND=3&adjacent=true&locale=en_EP&FT=D&date=20081223&CC=KR&NR=100875709B1&KC=B1.*

(Continued)

*Primary Examiner* — Arrie L Reuther
(74) *Attorney, Agent, or Firm* — Park & Associates IP Law, P.C.

(57) ABSTRACT

The present invention provides a method for manufacturing a coated yarn having outstanding physical properties, the method comprising: collecting thermoplastic polyurethane in virgin form, as scraps remaining after being suitably used for airbag patterns in a shoe manufacturing process, or as scraps remaining after other thermoplastic polyurethane is processed; mixing the various kinds of thermoplastic polyurethane with various additives; compounding the resultant mixture using an extruder to prepare a thermoplastic polyurethane compound for a coated yarn; and coating the surface of a yarn made from polyester, nylon, spandex, etc. with the compound using an extruder.

5 Claims, 1 Drawing Sheet

Related U.S. Application Data continuation of application No. PCT/KR2012/008801, filed on Oct. 25, 2012.

(51) Int. Cl.
 *D06M 101/34* (2006.01)
 *D06M 101/38* (2006.01)

(56) References Cited

OTHER PUBLICATIONS

English Machine Translation of KR100444297 B1Obtained Sep. 13, 2016 at:https://worldwide.espacenet.com/publicationDetails/biblio?CC=KR&NR=20020077044A&KC=A&FT=D&ND=3&date=20021011&DB=EPODOC&locale=en_EP.*

* cited by examiner

THERMOPLASTIC POLYURETHANE COMPOUND COMPOSITION FOR COATED YARN AND METHOD FOR MANUFACTURING COATED YARN USING THE THERMOPLASTIC POLYURETHANE COMPOUND

REFERENCE TO RELATED APPLICATIONS

This is divisional of U.S. patent application Ser. No. 14/314,400 filed Jun. 25, 2014 which is a continuation of International Patent Application PCT/KR2012/008801 filed on Oct. 25, 2012, which designates the United States and claims priority of Korean Patent Application No. 10-2011-0146923 filed on Dec. 30, 2011, and Korean Patent Application No. 10-2012-0114735 filed on Oct. 16, 2012, the entire contents of which are incorporated herein by reference.

FIELD OF THE INVENTION

The present invention relates to a thermoplastic polyurethane compound composition which is used to form a coating layer on the surface of yarn made of polyester, nylon, spandex or the like, and more particularly to a thermoplastic polyurethane compound composition, which is used to produce coated yarn by mixing thermoplastic polyurethane resin with additives, compounding the mixture in an extruder and coating the surface of yarn (made of polyester, nylon, spandex or the like) with the compounded thermoplastic polyurethane to form a coating layer, and to a method of producing coated yarn using the thermoplastic polyurethane compound composition.

BACKGROUND OF THE INVENTION

As is known, yarns that are used to make industrial blind or floor materials are made of polyester, nylon, spandex or the like. However, these yarns have low rigidity, and thus a coating layer is formed on the surface of the yarns. Coated yarn is produced by coating PVC or PP on the surface of yarn made of polyester, nylon, spandex or the like while passing the yarn through a coating machine, particularly the core of the coating machine, in a state in which the yarn is wound around bobbins on the shelf.

However, the coated yarn produced by the above-described method has disadvantages of low durability and abrasion resistance, as well as insufficient properties such as low mechanical strength and chemical strength. For this reason, industrial blind or floor materials made of the coated yarn cannot be used for a long period of time in industrial fields.

In addition, among prior art documents as described below, prior art document (Korean Patent Registration No. 10-0875709; hereinafter referred to "conventional technology") discloses coated yarn produced by coating the surface of yarn with thermoplastic polyurethane and a non-slipping fabric made of the coated yarn.

However, in the case of the conventional technology, when thermoplastic polyurethane is used, productivity is reduced to the low viscosity of the thermoplastic polyurethane, and particularly, it is impossible to produce coated yarn having thin thickness. In addition, the surface of the coated yarn becomes glossy, and for this reason, an additional process for matting the surface is required.

PRIOR ART DOCUMENTS

Patent Documents

Document 1: Korean Patent Laid-Open Publication No. 10-2012-0078630 (entitled "polyester yarn and production method thereof; published on Jul. 10, 2012).

Document 2: Korean Patent No. 10-0875709 (entitled "non-slipping fabric comprising thermoplastic polyurethane-coated yarn; published on Dec. 23, 2008).

Document 3: Korean Patent Laid-Open Publication No. 10-2008-0028665 (entitled "apparatus of producing PVC-coated yarn using polyester yarn; published Apr. 1, 2008).

Document 4: Korean Patent No. 10-0749311 (entitled "method for producing yarn"; published on May 16, 2007).

Document 5: Korean Patent No. 10-0752272 (entitled "method for producing coated yarn having glossy and metallic feeling and dice for use in production of yarn; published on Sep. 18, 2007).

SUMMARY OF THE INVENTION

The present invention has been made in order to solve the above-described problems occurring in the prior art, and it is an object of the present invention to provide a thermoplastic polyurethane compound composition, which is used to produce a coated yarn having high durability, abrasion resistance, mechanical strength and chemical strength by mixing thermoplastic polyurethane resin with various additives, compounding the mixture in an extruder, and coating the compounded thermoplastic polyurethane on the surface of yarn (made of polyester, nylon, spandex or the like) in a conventional extruder to form a coating layer, and a method of producing coated yarn using the thermoplastic polyurethane compound composition.

Another object of the present invention is to provide a thermoplastic polyurethane compound composition for coating yarn, which can be used in a wide range of applications, including blind or floor materials, sports goods and daily necessities, and a method of producing coated yarn using the thermoplastic polyurethane compound composition.

Still another object of the present invention is to provide a thermoplastic polyurethane compound composition for coating yarn, which comprises, in addition to thermoplastic polyurethane, a thickener that can increase the viscosity of coating solution to achieve a required discharge rate (preferably, a discharge rate of 600 m/min or higher, which makes it possible to increase productivity and produce yarns having a fineness of 1,000 denier or less), and a method of producing coated yarn using the thermoplastic polyurethane compound composition.

The present invention is characterized in that a thermoplastic polyurethane compound for coating yarn is prepared by compounding a thermoplastic polyurethane with a thickener and a processing aid, the color of the thermoplastic polyurethane compound may be reproduced by adding a master batch corresponding to a desired color, and a coated yarn having a desired thickness may be produced by coating the thermoplastic polyurethane compound on the surface of yarn made of polyester, nylon, spandex or the like in a conventional extruder.

In addition, the present invention is characterized in that the thickener that is used to prepare the thermoplastic polyurethane compound for coating yarn is any one selected from among inorganic materials, including silica, talc and calcium carbonate ($CaCO_3$).

DETAILED DESCRIPTION OF THE INVENTION

Figure 1:
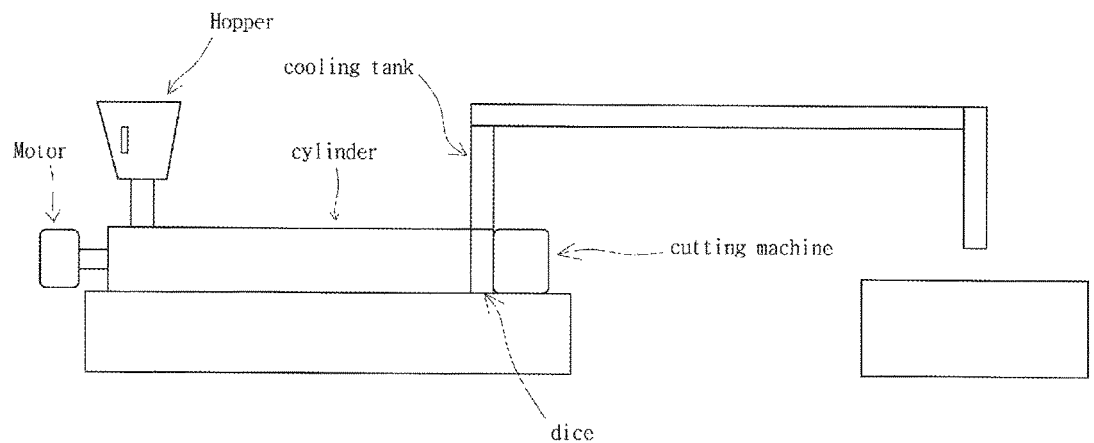
FIG. 1 shows a process of producing a thermoplastic polyurethane compound for coating of yarn according to a preferred embodiment of the present invention by mixing thermoplastic polyurethane with various additives and compounding the mixture in an extruder.

The present invention provides a thermoplastic polyurethane compound composition which is used to produce coated yarn, the composition comprising thermoplastic polyurethane and a thickener.

Hereinafter, preferred embodiments of the present invention will be described detail with reference to the accompanying drawings. In the following detailed description, exemplary embodiments for solving the technical problem of the present invention will be described. Embodiments other than the disclosed embodiments may also be contemplated according to the present invention.

The present invention provides a method capable of producing a coated yarn having excellent physical properties, the method comprising: preparing virgin thermoplastic polyurethane or collecting thermoplastic polyurethane scrap remaining after the manufacture of airbag patterns in footwear manufacturing processes or after processing of thermoplastic polyurethane; mixing the thermoplastic polyurethane with various additives; compounding the mixture in an extruder to prepare a thermoplastic polyurethane compound (hereinafter referred to as "TPU compound") for coating yarn; and coating the TPU compound on the surface of yarn made of polyester, nylon, spandex or the like in a conventional extruder. The present invention also provides a thermoplastic polyurethane compound composition which is used to produce the coated yarn.

In the present invention, coated yarn having a desired color can be produced by adding a master batch corresponding to the desired color during production of the TPU compound for coating yarn. Moreover, a TPU compound for coating yarn, which has a desired hardness, can be prepared by controlling the content of raw material. In addition, the thickness of coated yarn can be reduced depending on the thickness of yarn made of polyester, nylon, spandex or the like.

Thus, the present invention provides a thermoplastic polyurethane compound composition, which is used to produce a coated yarn which has excellent durability and abrasion resistance and good mechanical strength and chemical strength due to the inherent physical properties of thermoplastic polyurethane, and thus can be used in a wide range of applications, including sports goods, daily necessities and industrial supplies. The present invention also provides a method of producing coated yarn using the thermoplastic polyurethane compound composition.

Hereinafter, the present invention will be described in detail with reference to preferred embodiments, but the scope of the present invention is not limited to these embodiments.

Embodiment 1

A method of producing coated yarn using thermoplastic polyurethane according to a preferred embodiment of the present invention is divided into the following two steps: a first step of preparing a TPU compound for coating yarn; and a second step of coating the surface of yarn with the TPU compound. The production method according to the present invention will now be described in further detail with reference to FIGS. 1 and 2. The first step is a step of mixing thermoplastic polyurethane with various additives and compounding the mixture in an extruder to prepare a TPU compound for coating yarn and is specifically shown in FIG. 1. The second step is a step of coating the TPU compound on the surface of yarn made of polyester, nylon, spandex or the like and is specifically shown in FIG. 2.

1. Step of Preparing TPU Compound for Coating Yarn

As shown in FIG. 1, this step comprises: 1) mixing thermoplastic polyurethane with various additives (preferably a thickener and a processing aid) and feeding the mixture into the hopper of a conventional compounding extruder; 2) melting, kneading and compounding the mixture in the cylinder of the compounding extruder at a temperature of 150~250° C. and a pressure of 50-150 kgf; 3) cutting a coating solution (i.e., compounded thermoplastic polyurethane coating solution), discharged through the dice of the compounding extruder, in cooling water to form pellets; and 4) drying the formed thermoplastic polyurethane pellets at a temperature of 60~80° C. for 4-6 hours and aging the dried pellets at a temperature of 30~50° C. for 7 days or more.

Hereinafter, components that are used in the production of a TPU compound for coating yarn, that is, thermoplastic polyurethane, a thickener and a processing aid, will be described.

The thermoplastic polyurethane is a virgin thermoplastic polyurethane prepared by polymerizing aromatic isocyanate or aliphatic isocyanate with polyether polyol or polycarprolactone using short chain glycol (e.g., 1,4-butanediol) as a chain extender.

In the present invention, in addition to virgin thermoplastic polyurethane, thermoplastic polyurethane scrap remaining after the manufacture of footwear may also be used in the present invention. Specifically, either airbag scrap remaining after the processing of airbags for footwear or clear or semi-clear type thermoplastic polyurethane scrap is used.

In the present invention, a thickener is used during the preparation of a thermoplastic polyurethane coating solution in order to improve productivity and matting properties. As the thickener, silica powder or an inorganic material (e.g., talc or $CaCO_3$) that increases viscosity is used. The thickener that is used in the present invention may also be an alloy with a resin such as a styrene butadiene styrene (SBS) block copolymer, a styrene ethylene/butylene styrene (SEBS) resin, a polyacetal resin (POM) or a styrene acrylonitrile resin (SAN), which can impart compatibility with thermoplastic polyurethane.

In the present invention, a processing agent is also used in order to improve productivity. Specifically, the processing agent is montane wax or a fatty acid ester ($C_5$-$C_9$) with pentaerythritol.

In addition, in the present invention, an adhesive additive is used after weaving of a mesh with coated yarn. The adhesive additive is an olefin (PE, PP, EVA, etc.)-based coupling agent (containing 2-20% maleic anhydride).

Table 1 below show the results of using silica as a thickener when producing coated yarn using thermoplastic polyurethane according to the present invention.

TABLE 1

| TPU compound (product name) | Melt index (g/10 min) | Flow beginning temperature (° C.) | Flow viscosity 165° C. | Flow viscosity 170° C. | Extrusion workability | Silica content |
|---|---|---|---|---|---|---|
| ESTANE58277 (Lubrizol) | 19.58 | 155.2 | 30,950 | 10,830 | Poor | 0.0 phr |
| AK-92A-4 | 13.50 | 154.6 | 34,380 | 12,030 | Good | 1.5 phr |
| AK-92A-5 | 8.45 | 156.5 | 40,570 | 14,930 | Good | 3.0 phr |

As can be seen in Table 1 above, as the silica content increased, the melt index decreased and the flow viscosity increased, suggesting that silica showed a thickening effect. Also, it could be seen that the extrusion workability was good when the silica content was 1.5 phr or higher. Further, the product having a silica content of 3.0 phr showed good extrusion workability, but was difficult to apply, due to the occurrence of blooming.

Additionally, the product names "AK-92A-4" and "AK-92A-5" shown in Table 1 are TPU compounds for coating yarn, prepared by the composition and preparation method of the present invention. Preferably, these product names are TPU compounds for coating yarn, prepared using silica as a thickener. In addition, the product name "ESTANE58277 (Lubrizol)" shown in Table 1 is a compound for coating yarn, prepared according to the method of conventional technology.

Table 2 below shows components that are added to prepare TPU compounds (particularly "AK-92A-4" or "AK-92A-5" shown in Table 1) for coating yarn, and the composition ratio of the components.

TABLE 2

| Composition of the present invention | AK-92A-4 (wt %) | AK-92A-5 (wt %) |
|---|---|---|
| Footwear airbag scrap | 50.0 | 50.0 |
| Virgin TPU | 43.0 | 41.5 |
| Polyethylene-based coupling agent | 5.0 | 5.0 |
| Silica (thickener) | 1.5 | 3.0 |
| Montane wax | 0.2 | 0.2 |
| Fatty acid ester | 0.3 | 0.3 |

Table 3 below shows a composition between the physical properties of TPU compounds (particularly "AK-92A-4" and "AK-92A-5" shown in Table 2) for coating yarn, prepared by the composition and preparation method of the present invention, and the physical properties of a compound for coating yarn (e.g., "ESTANE58277 (Lubrizol) shown in Table 1), prepared by conventional technology.

TABLE 3

| | TPU compounds of the present invention | | Compound according to conventional technology | Remarks |
|---|---|---|---|---|
| Product name | AK-92A-4 | AK-92A-5 | ESTANE58277 (Lubrizol) | |
| TPU melt viscosity (g/10 min) | 13.5 | 8.45 | 15.2 | 200° C., 2.16 kgf |
| TPU flow beginning temperature (° C.) | 154.6 | 156.5 | 155.2 | |
| Core yarn | Polyester yarn | Polyester yarn | Polyester yarn | |
| TPU tensile strength | 250 kgf/cm² | 230 kgf/cm² | 350 kgf/cm² | |
| TPU tear strength | 110 kgf/cm | 105 kgf/cm | 120 kgf/cm | |
| TPU specific gravity | 1.20-1.21 | 1.20-1.21 | 1.21-1.22 | g/cc |
| TPU hardness | 91 ± 2A | 91 ± 2A | 92 ± 2A | Shore A |
| Minimum thickness of coated yarn | 0.2Ø | 0.2Ø | 0.4Ø | PVC: 0.2Ø |
| Coated yarn productivity | 500-600 rpm/min | 500-600 rpm/min | 100-150 rpm/min | PVC: 600-700 rpm/min |
| Adhesive strength of mesh woven with coated yarn | 2.5-3.0 kgf | 1.5-2.0 kgf | 0.5-1.0 kgf | Adhered to reflective film (using glass bead) |

As can be seen from the results in Table 3 above, the products ("AK-92A-4" and "AK-92A-5") obtained using silica as a thickener showed significantly high productivity, thin thickness and good adhesive strength compared to the product ("ESTANE58277 (Lubrizol)") obtained using general TPU. Also, it can be seen that the product "AK-92A-5" had low adhesive strength due to blooming caused by an excessively high content of silica. In addition, the use of silica can also provide matting effects.

Table 4 below shows the results of using an inorganic material (e.g., talc) as a thickener.

TABLE 4

| TPU compound (product name) | Melt index (g/10 min) | Flow beginning temperature (° C.) | Flow viscosity 165° C. | Flow viscosity 170° C. | Extrusion workability | Talc |
|---|---|---|---|---|---|---|
| ESTANE58277 (Lubrizol) | 19.58 | 155.2 | 30,950 | 10,830 | Poor | 0.0 phr |
| TC-92A-3 | 9.50 | 157.8 | 43,380 | 15,030 | Good | 10 phr |
| TC-92A-6 | 5.65 | 158.5 | 60,550 | 18,880 | Good | 20 phr |

As can be seen in Table 4 above, as the talc content increased, the melt index decreased and the flow viscosity increased, suggesting that talc showed a thickening effect. Also, it could be seen that the extrusion workability was good when the talc content was 10 phr or higher. Further, the product having a talc content of 30 phr showed good extrusion workability, but was difficult to apply, due to the occurrence of blooming.

Meanwhile, the product names "TC-92A-3" and "TC-92A-6" shown in Table 4 are TPU compounds for coating yarn, prepared by the composition and preparation method of the present invention. Preferably, these product names are TPU compounds for coating yarn, prepared using talc as a thickener. In addition, the product name "ESTANE58277 (Lubrizol)" shown in Table 4 is a compound for coating yarn, prepared according to the method of conventional technology.

Table 5 below shows components that are added to prepare TPU compounds (particularly "TC-92A-3" or "TC-92A-6" shown in Table 4) for coating yarn, and the composition ratio of the components.

TABLE 5

| Composition of the present invention | TC-92A-3 (wt %) | TC-92A-6 (wt %) |
|---|---|---|
| Footwear airbag scrap | 40.0 | 40.0 |
| Virgin TPU | 44.5 | 34.5 |
| Polyethylene-based coupling agent | 5.0 | 5.0 |
| Talc (thickener) | 10.0 | 20.0 |
| Montane wax | 0.2 | 0.2 |
| Fatty acid ester | 0.3 | 0.3 |

Table 6 below shows a composition between the physical properties of TPU compounds (particularly "TC-92A-3" and "TC-92A-6" shown in Table 5) for coating yarn, prepared by the composition and preparation method of the present invention, and the physical properties of a compound for coating yarn (e.g., "ESTANE58277 (Lubrizol) shown in Table 4), prepared by conventional technology.

TABLE 6

| | TPU compounds of the present invention | | Compound according to conventional technology | Remarks |
|---|---|---|---|---|
| Product name | TC-92A-3 | TC-92A-6 | ESTANE58277 (Lubrizol) | |
| TPU melt viscosity (g/10 min) | 9.50 | 5.65 | 15.2 | 200° C., 2.16 kgf |
| TPU flow beginning temperature (° C.) | 157.8 | 158.5 | 155.2 | |
| Core yarn | Polyester yarn | Polyester yarn | Polyester yarn | |
| TPU tensile strength | 200 kgf/cm² | 160 kgf/cm² | 350 kgf/cm² | |
| TPU tear strength | 100 kgf/cm | 90 kgf/cm | 120 kgf/cm | |
| TPU specific gravity | 1.21-1.22 | 1.22-1.23 | 1.21-1.22 | g/cc |
| TPU hardness | 92 ± 2A | 93 ± 2A | 92 ± 2A | Shore A |
| Minimum thickness of coated yarn | 0.2Ø | 0.25Ø | 0.4Ø | PVC: 0.2Ø |
| Coated yarn productivity | 300-400 rpm/min | 300-400 rpm/min | 100-150 rpm/min | PVC: 600-700 rpm/min |
| Adhesive strength of mesh woven with coated yarn | 1.5-2.0 kgf | 1.0-1.5 kgf | 0.5-1.0 kgf | Adhered to reflective film (using glass bead) |

As can be seen from the results in Table 6 above, the products ("TC-92A-3" and "TC-92A-6") obtained using talc as a thickener showed high productivity and thin coated yarn thickness compared to the product ("ESTANE58277 (Lubrizol)") obtained using general TPU, but these products showed slightly low productivity and low adhesive strength compared to the products ("AK-92A-4" and "AK-92A-5") obtained using silica as a thickener. Also, it can be seen that the product "TC-92A-6" had low adhesive strength due to blooming caused by an excessively high content of talc.

Table 7 below show the results of using polyacetal resin (POM) as a thickener when producing coated yarn using thermoplastic polyurethane according to the present invention.

TABLE 7

| TPU compound (product name) | Melt index (g/10 min) | Flow beginning temperature (° C.) | Flow viscosity 165° C. | Flow viscosity 170° C. | Extrusion workability | POM content |
|---|---|---|---|---|---|---|
| ESTANE58277 (Lubrizol) | 19.58 | 155.2 | 30,950 | 10,830 | Poor | 0.0 phr |
| PA-95A-3 | 10.20 | 178.2 | 52,240 | 27,830 | Good | 10 phr |
| PA-95A-5 | 6.65 | 185.1 | 63,580 | 37,880 | Good | 20 phr |

As can be seen in Table 7 above, as the POM content increased, the melt index decreased and the flow viscosity increased, suggesting that POM showed a thickening effect.

Also, it could be seen that the extrusion workability was good when the POM content was 10 phr or higher. Further, the product having a POM content of 10 phr showed good extrusion workability, but had hard significantly hard feeling due to increased hardness.

Additionally, the product names "PA-95A-3" and "PA-95A-5" shown in Table 7 are TPU compounds for coating yarn, prepared by the composition and preparation method of the present invention. Preferably, these product names are TPU compounds for coating yarn, prepared using polyacetal resin (POM) as a thickener. In addition, the product name "ESTANE58277 (Lubrizol)" shown in Table 7 is a compound for coating yarn, prepared according to the method of conventional technology.

Table 8 below shows components that are added to prepare TPU compounds (particularly "PA-95A-3" or "PA-95A-5" shown in Table 7) for coating yarn, and the composition ratio of the components.

TABLE 8

| Composition of the present invention | PA-95A-3 (wt %) | PA-95A-5 (wt %) |
|---|---|---|
| Virgin TPU | 84.5 | 74.5 |
| Polyethylene-based coupling agent | 10.0 | 20.0 |
| POM resin | 5.0 | 5.0 |
| Montane wax | 0.2 | 0.2 |
| Fatty acid ester | 0.3 | 0.3 |

Table 9 below shows a composition between the physical properties of TPU compounds (particularly "PA-95A-3" and "PA-95A-5" shown in Table 8) for coating yarn, prepared by the composition and preparation method of the present invention, and the physical properties of a compound for coating yarn (e.g., "ESTANE58277 (Lubrizol)" shown in Table 7), prepared by conventional technology.

TABLE 9

| | TPU compounds of the present invention | | Compound according to conventional technology | Remarks |
|---|---|---|---|---|
| Product name | AK-92A-3 | AK-92A-5 | ESTANE58277 (Lubrizol) | |
| TPU melt viscosity (g/10 min) | 10.2 | 6.65 | 15.2 | 200° C., 2.16 kgf |
| TPU flow beginning temperature (° C.) | 178.2 | 185.1 | 155.2 | |
| Core yarn | Polyester yarn | Polyester yarn | Polyester yarn | |
| TPU tensile strength | 300 kgf/cm$^2$ | 250 kgf/cm$^2$ | 350 kgf/cm$^2$ | |
| TPU tear strength | 150 kgf/cm | 160 kgf/cm | 120 kgf/cm | |
| TPU specific gravity | 1.20-1.21 | 1.19-1.20 | 1.21-1.22 | g/cc |
| TPU hardness | 95 ± 2A | 97 ± 2A | 92 ± 2A | Shore A |
| Minimum thickness of coated yarn | 0.2Ø | 0.2Ø | 0.4Ø | PVC: 0.2Ø |
| Coated yarn productivity | 350-450 rpm/min | 300-400 rpm/min | 100-150 rpm/min | PVC: 600-700 rpm/min |
| Adhesive strength of mesh woven with coated yarn | 2.5-3.0 kgf | 2.0-2.5 kgf | 0.5-1.0 kgf | Adhered to reflective film (using glass bead) |

As can be seen from the results in Table 9 above, the products ("PA-95A-3" and "PA-95A-5") obtained using POM resin as a thickener showed high productivity and thin coated yarn thickness compared to the product ("ESTANE58277 (Lubrizol)") obtained using general TPU, but these products showed slightly low productivity compared to the products obtained using silica. Also, it can be seen that the product "PA-95A-5" had high hardness due to an excessively high content of POM resin, suggesting that it would provide a fabric having significantly hard feeling.

From the results of using the thickeners as described above, it can be seen that the use of silica as a thickener showed the highest productivity and excellent matting effects, suggesting that it can provide the best product (coated yarn).

The physical properties shown in Tables 3, 6 and 9 above, including TPU melt viscosity, TPU flow beginning temperature, TPU tensile strength, TPU tear strength, TPU specific gravity and TPU hardness, are the physical properties of the TPU compound for coating yarn to be provided by the present invention.

2. Step of Producing Coated Yarn

The step of producing coated yarn is a step of coating the TPU compound on the surface of yarn (made of polyester, nylon, spandex or the like).

Figure 2:
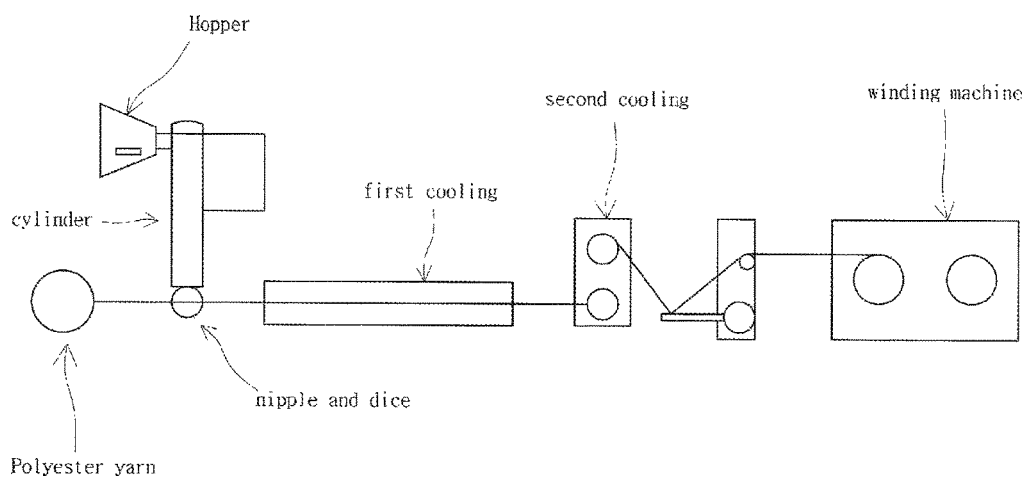
FIG. 2 shows a process of coating a thermoplastic polyurethane compound, obtained as shown in FIG. 1, on the surface of yarn made of polyester, nylon, spandex or the like according to a preferred embodiment of the present invention.

As shown in FIG. 2, this step comprises: 1) mixing the TPU compound for coating yarn (i.e., pellet-type thermoplastic polyurethane as described above) with a master batch corresponding to a desired color and feeding the mixture into the hopper of a yarn coating extruder; 2) melting the mixture of the TPU compound and the master batch in the cylinder of the yarn coating extruder at a temperature of 150~250° C. and a pressure of 50-150 kgf; 3) coating the TPU compound on the surface of yarn (made of polyester, nylon, spandex or the like) passing through a nipple and a dice to produce coated yarn; and 4) winding the coated yarn around a bobbin using a winding machine.

As shown in FIG. 2, coated yarn comprising thermoplastic polyurethane according to the present invention can be obtained by coating a TPU compound (particularly, dried and aged pellet-type thermoplastic polyurethane), prepared by the preparation method and composition of the present invention, on the surface of yarn made of polyester, nylon, spandex or the like.

The thermoplastic polyurethane compound composition according to the embodiment of the present invention and the method of producing coated yarn using the thermoplastic polyurethane compound composition achieves the following effects.

First, because the thermoplastic polyurethane compound for coating yarn according to the present invention is prepared by compounding thermoplastic polyurethane with a thickener (preferably an inorganic material such as silica, talc or calcium carbonate) in an extruder, higher productivity (i.e., 3-5 times higher productivity) and excellent matting properties compared to the use of conventional thermoplastic polyurethane can be achieved in the present invention.

Second, fabric made of the coated yarn of the present invention has excellent abrasion resistance, high tensile strength and excellent waterproof properties and can show excellent thermal moldability and adhesive properties, compared to conventional fabric.

Third, because the coated yarn according to the present invention has excellent durability, abrasion resistance and mechanical strength, it can be applied to sports good, daily necessities, industrial supplies and the like.

What is claimed is:

1. A method for producing coated yarn using thermoplastic polyurethane, the method comprising the steps of:
    providing a yarn core made of polyester, nylon, or spandex;
    mixing thermoplastic polyurethane with a thickener;
    wherein the thickener is selected from the group consisting of silica, talc, calcium carbonate, and an alloy with a resin selected from a styrene butadiene styrene block copolymer, a styrene ethylene/butylene styrene resin, a polyacetal resin, and a styrene acrylonitrile resin;
    melting and kneading the mixture;
    drying and aging the kneaded mixture to prepare a thermoplastic polyurethane compound; and
    melting the thermoplastic polyurethane compound and coating the melted compound on the surface of the yarn made of polyester, nylon, or spandex.

2. The method of claim 1, wherein the method further comprises adding and mixing a processing aid when mixing the thermoplastic polyurethane with the thickener.

3. The method of claim 2, wherein the method further comprises adding and mixing an olefin-based coupling agent.

4. The method of claim 2, wherein the processing aid is selected from the group consisting of montane wax and fatty acid ester (C5-C9) with pentaerythritol.

5. The method of claim 1, wherein said melting to coat the melted compound on the surface of the yarn is performed at a temperature of 150~250° C. and a pressure of 50-150 kgf.

* * * * *